United States Patent
Cooney, Jr. et al.

(10) Patent No.: US 8,943,163 B2
(45) Date of Patent: *Jan. 27, 2015

(54) SYSTEM FOR AUTOMATING SCIENTIFIC AND ENGINEERING EXPERIMENTATION

(75) Inventors: George A. Cooney, Jr., Eureka, CA (US); Richard P. Verseput, McKinleyville, CA (US)

(73) Assignee: S-Matrix, Eureka, CA (US)

( * ) Notice: Subject to any disclaimer, the term of this patent is extended or adjusted under 35 U.S.C. 154(b) by 2015 days.

This patent is subject to a terminal disclaimer.

(21) Appl. No.: 11/909,773

(22) PCT Filed: May 2, 2006

(86) PCT No.: PCT/US2006/016801
§ 371 (c)(1),
(2), (4) Date: May 12, 2010

(87) PCT Pub. No.: WO2006/119275
PCT Pub. Date: Nov. 9, 2006

(65) Prior Publication Data
US 2010/0306784 A1 Dec. 2, 2010

Related U.S. Application Data

(60) Provisional application No. 60/677,104, filed on May 2, 2005.

(51) Int. Cl.
*G06F 15/16* (2006.01)
*G06Q 10/06* (2012.01)

(52) U.S. Cl.
CPC .................................. *G06Q 10/06* (2013.01)
USPC .......................................... 709/217; 709/219

(58) Field of Classification Search
CPC ...................................................... H04L 67/12
USPC .................................................. 709/217, 219
See application file for complete search history.

(56) References Cited

U.S. PATENT DOCUMENTS 4,412,288 A 10/1983 Herman
5,369,566 A 11/1994 Pfost et al.
(Continued)

FOREIGN PATENT DOCUMENTS

WO WO 00/52646 9/2000
WO WO2004038602 5/2004

OTHER PUBLICATIONS

Lukulay, Patrick & Verseput, Richard; Automating HPLC and GC Analytical Method Validation; May 1, 2005; Pharmaceutical Technology; Online / Web Article; pp. 1-6; http://www.highbeam.com/doc/1P3-838860251.html.*

(Continued)

*Primary Examiner* — Glenford Madamba
(74) *Attorney, Agent, or Firm* — Sawyer Law Group, P.C.

(57) ABSTRACT

A system for automating experimentation is disclosed. The system comprises an automated experimentation platform (AEP) for automating research, development, and engineering experimentation processes and work and a generalized exchange module (GEM) for automating data exchanges between the AEP and external software applications, devices, or the instrument control programs (ICPs) controlling the devices; a generalization of the exchange module enables all automated data exchanges to be generic. Through the use of the automated experimentation platform (AEP) and the generalized exchange module (GEM), the automation can be adapted to any targeted external software application, device or a devices' controlling software program.

18 Claims, 12 Drawing Sheets

(56) References Cited

U.S. PATENT DOCUMENTS

| | | | |
|---|---|---|---|
| 5,419,328 | A | 5/1995 | Goh et al. |
| 5,959,297 | A | 9/1999 | Weinberg et al. |
| 6,004,617 | A | 12/1999 | Schultz et al. |
| 6,030,917 | A | 2/2000 | Weinberg et al. |
| 6,034,775 | A | 3/2000 | McFarland et al. |
| 6,178,382 | B1 | 1/2001 | Roederer et al. |
| 6,489,168 | B1 | 12/2002 | Wang et al. |
| 6,581,012 | B1 | 6/2003 | Aryev et al. |
| 6,658,429 | B2 | 12/2003 | Dorsett, Jr. |
| 6,728,641 | B1 | 4/2004 | Cawse |
| 6,754,543 | B1 | 6/2004 | Wold |
| 6,853,923 | B2 | 2/2005 | Trygg et al. |
| 6,909,974 | B2 | 6/2005 | Yung et al. |
| 6,947,953 | B2 | 9/2005 | Herzenberg et al. |
| 6,996,550 | B2 | 2/2006 | Wang et al. |
| 7,194,374 | B2 | 3/2007 | Kobayashi et al. |
| 7,213,034 | B2 | 5/2007 | Dorsett, Jr. |
| 7,427,479 | B2 | 9/2008 | Karger et al. |
| 7,474,925 | B2 | 1/2009 | Renner |
| 7,519,605 | B2 | 4/2009 | Vailaya et al. |
| 2001/0039539 | A1 | 11/2001 | Sartiel et al. |
| 2002/0049782 | A1 | 4/2002 | Herzenberg et al. |
| 2002/0152057 | A1 | 10/2002 | Wang et al. |
| 2002/0156792 | A1 | 10/2002 | Gombocz et al. |
| 2003/0004612 | A1 | 1/2003 | Domanico et al. |
| 2003/0050763 | A1 | 3/2003 | Arrit et al. |
| 2003/0149501 | A1 | 8/2003 | Tuszynski |
| 2003/0200004 | A1 | 10/2003 | Renner |
| 2004/0034478 | A1 | 2/2004 | Yung et al. |
| 2004/0148291 | A1 | 7/2004 | Dorsett, Jr. |
| 2005/0026131 | A1 | 2/2005 | Elzinga et al. |
| 2005/0044110 | A1 | 2/2005 | Herzenberg et al. |
| 2005/0080588 | A1 | 4/2005 | Kobayashi et al. |
| 2005/0154701 | A1 | 7/2005 | Parunak et al. |
| 2005/0273475 | A1 | 12/2005 | Herzenberg et al. |
| 2005/0278321 | A1 | 12/2005 | Vailaya et al. |
| 2006/0003351 | A1 | 1/2006 | Karger et al. |
| 2006/0074726 | A1 | 4/2006 | Forbes et al. |
| 2007/0048863 | A1 | 3/2007 | Rodgers et al. |
| 2008/0137080 | A1 | 6/2008 | Bodzin et al. |
| 2008/0215705 | A1 | 9/2008 | Liu et al. |

OTHER PUBLICATIONS

Kwangsun Yoon, "The Propagation of Errors in Multiple-attribute Decision Analysis: A Practical Approach", The Journal of the Operational Research Society, vol. 40, No. 7 (Jul. 1989), pp. 681-686.
Lukulay, Patrick, et al., "Data and Review," Article, 5 pages.
Kwangsun Yoon "The Propagation of Errors in Multiple-attributed Decision Analysis: A Practical Approach" The Journal of the Operational Research Society, (Jul. 1989) vol. 40, No. 7, pp. 681-686.
Winton, Don. "Process Capability Studies", 1999, 16 pages.
Shabir, Ghulam. "Validation of high-performance liquid chromatography methods for pharmaceutical analysis", 2003, Journal of Chromatography, vol. 987, pp. 57-66.
"Var Tran 3.2 Tutorials: Guide to Getting Started", 2005, 32 pages.
Sematech, "Sematech qualification plan guidelines for engineering", 1995, 106 pages.
Lukulay et al., "Automating HPLC and GC Analytical Method Validation", Data and Review, May 2, 2005, 5 pgs.

* cited by examiner

600

Automated experiment running and file-less import from ICP as completed results data sets Results Data Sets in ICP Import from ICP

- Data Analysis
- 2D, 3D, 4D (Trellis) Graphing
- Numerical & Graphical Optimization
- Formal Reporting
  HTML, PDF, DOC, RTF, TXT

SYSTEM FOR AUTOMATING SCIENTIFIC AND ENGINEERING EXPERIMENTATION

FIELD OF THE INVENTION

The present invention relates generally to automating research, development, and engineering experimentation processes and work and more specifically to providing a system for automated experimentation.

BACKGROUND OF THE INVENTION

The execution steps in most research, development, and engineering experiments generally involve manual operations carried out on unconnected technology platforms. The scientist or engineer works in what are essentially isolated technology islands with manual operations providing the only bridges. To illustrate, when there is a Standard Operating Practice (SOP) Guide for the experimental work, it is often an electronic document, for example in Microsoft Word. The experimental plan (Step 1) within the SOP Guide has to be transferred to the target device (instrument, instrument platform, or component module for execution (Step 2) by manually re-keying the experiment into the device's instrument control program (ICP)—the device's controlling application software. In a few cases the statistical analysis of results (Step 3a) can be done within the ICP, but it is most often done within a separate statistical analysis software package or spreadsheet program such as Microsoft Excel. This also requires manually transferring the results data from the ICP to the analysis software package. Reporting of results (Step 3b) is usually carried out in Microsoft Word, and therefore requires the manual transfer of all results tables and graphs from the separate statistical analysis software package. The manual operations within the general execution sequence steps are presented below. The isolated technology islands are illustrated in FIGS. 1 and 2.

FIG. 1 illustrates the manual tools and operations involved in carrying out a research and development experiment. In this work a statistical experiment design protocol is first generated, via step 12. This protocol is developed manually and off-line using nonvalidated tools such as Microsoft Word. The protocol then must be approved, once again manually and off-line, via step 14. Next, sample amounts are calculated using non-validated tools such as Microsoft Excel, via step 16. Thereafter the samples are prepared, via step 18 and the experiment is run on a target device, via step 20, for example, a high-performance liquid chromatograph (HPLC). Running the experiment requires manually re-constructing the statistical design within the target device's ICP. When this software does not exist, or does not allow for full instrument control, the experiment must be carried out in a fully manual mode by manually adjusting instrument settings between experiment runs.

FIG. 2 illustrates the manual tools and operations involved in analyzing the data and reporting the results of the research and development experiment, via step 22. The analysis and reporting of data is accomplished by first statistically analyzing and interpreting the data, off-line, using non-validated tools such as Microsoft Excel. Next, it is determined whether or not there is a need for more experiments, possibly using off-line generic design of experiments (DOE) software, via step 24. Then, data are entered and a report is written, via step 26. Finally, the report is archived, via step 28. As is seen from the above, the research, development, and engineering experimentation process involves a series of activities that are currently conducted in separate "technology islands" that require manual data exchanges among the tools that are used for each activity. However, until now, no overarching automation technology exists that brings together all the individual activities under a single integrated-technology platform that is adapted to multiple devices and data systems.

Method validation activities encompass the planning and experimental work involved in verifying the fitness of an analytical method for its intended use. These activities are often captured in company Standard Operating Procedure (SOP) documents that usually incorporate Food and Drug Administration (FDA) and International Conference on Harmonization (ICH) requirements and guidances. Method validation SOP documents include a description of all aspects of the method validation work for each experiment type (e.g. accuracy, linearity) within a framework of three general execution sequence steps: (1) experimental plan, (2) instrumental procedures, and (3) analysis and reporting of results. The individual elements within these three general steps are presented below.

Step 1: Generate Experimental Plan
    Select experiment type
    Select target instrument
    Define study variables:
    analyte concentrations
    instrument parameters
    environmental parameters
    Specify number of levels per variable
    Specify number of preparation replicates per sample
    Specify number of injections per preparation replicate
    Integrate standards
    Include system suitability injections
    Define Acceptance Criteria Step 2: Construct Instrumental Procedures
    Define required transformations of the experiment plan into the native file or data formats of the instrument's controlling ICP software (construction of Sample Sets and Method Sets or Sequence and Methods files).
    Specify number of injections (rows)
    Specify type of each injection (e.g., sample, standard)
    Define required modifications to the analytical method (robustness)

Step 3: Analyze Data and Report Results
    Specify analysis calculations and report content and format
    Carry out numerical analyses
    Compare analysis results to acceptance criteria (FDA & ICH requirements)
    Specify graphs and plots that should accompany the analysis
    Construct graphs and plots
    Compile final report The execution steps in analytical method validation generally involve manual operations carried out on unconnected technology platforms. To illustrate, an SOP Guide for the validation of an HPLC analytical method is often an electronic document in Microsoft Word. The experimental plan (Step 1) within the SOP Guide has to be transferred to the HPLC instrument for execution (Step 2) by manually re-keying the experiment into the instrument platform's ICP—in the case of an HPLC this is typically referred to as a chromatography data system (CDS). In a few cases the statistical analysis of results (Step 3) can be performed within the CDS, but it is most often carried out within a separate statistical analysis software package or spreadsheet program such as Microsoft Excel. This also requires manually transferring the results data from the CDS to the analysis software package. Reporting of results (Step 3) is usually carried out in Microsoft Word, and therefore requires the manual transfer of all results tables and graphs from the separate statistical analysis software package. The manual operations within the three general execution sequence steps are presented below.

Step 1—Experimental Plan

Validation plan developed in Microsoft Word.

Experimental design protocol developed in off-line DOE software.

Step 2—Instrumental Procedures

Manually build the Sequences or Sample Sets in the CDS.

Raw peak (x, y) data reduction calculations performed by the CDS (e.g. peak area, concentration).

Step 3a—Statistical Analysis

Calculated results manually transferred from the CDS to Microsoft Excel.

Statistical analysis usually carried out manually in Microsoft Excel.

Some graphs generated manually in Microsoft Excel, some obtained from the CDS.

Step 3b—Reporting of Results

Reports manually constructed from template documents in Microsoft Word.

Graphs and plots manually integrated into report document.

Prior art systems are known in this area, but they do not address the overarching problem of removing the manually intensive steps required to bridge the separate technology islands. Relevant prior art that has been discovered by applicants is described herein below.

PRIOR ART

U.S. Pat. No. 5,369,566, Pfost et al.

This patent is directed to a method of programming a programmable controller in a manner by which a variety of menus, options, or questions seeking limited parameter answers.

The patent also relates to an analytical chemistry processing center and clinical and research laboratory workstation capable of performing the functions of several individual instruments and, more particularly, to an automated laboratory workstation useful in the performance of numerous chemical, biochemical, and biological assays and reactions.

US 20020156792, Gombocz et al.

This published application is directed to a system, method, computer program, and computer program product for the provision of interactive, unified, functionality for data acquisition, management, viewing, and analysis.

US 20030050763, Arrit et al.

This published application is directed to a referential and relational database software comprising (a) programmable access for imputation of laboratory operating procedures; (b) communication between said software and testing instrumentation, said software extracting information from said instrumentation; (c) automatic population of designated database fields from said information; (d) manual population of designated database fields; and (e) review of information.

U.S. Pat. No. 6,581,012 B1, Aryev et al.

This patent is directed to an integrated clinical laboratory software system for testing a specimen.

WO 2004/038602, A1, Baker

This international application is directed to computer software based system that provides for automated processing of raw spectral data, data standardization, reduction to data to modeling form, and unsupervised and supervised model building, visualization, analysis, and prediction.

US 2003/0200004, Renner

This published application is directed to a system for automation of technical processes and/or experiments having a measurement unit and a control unit which are connected to sensors and actuators of the process or of the experimental unit via measurements and control channels, having at least one library that contains visualization objects and control modules, and having software that manages the system.

US 2004/0034478, Yung et al.

This published application is directed to a computer software based system for integrating laboratory instrumentation and applications to provide a uniform control and coordination architecture under a common interface.

WO 2004/0148291 A1, Dorset Jr.

This international application is directed to models and apparatus, including computer program apparatus, representing a generic experiment model or class adaptable to a researcher-defined set of variables, for processing data from chemical experimentation.

US 20050080588, Kobayashi et al.

This published application is directed to providing an object of the present invention is to provide an object guide customizable measuring instrument that enables a user to execute an operation guide file created with use of a versatile language according to a desired purpose of use, and automatically operates the measurement instrument while making the operation guide displayable by execution of the operation guide file.

Accordingly, none of these references provide for a system or method to address the manually intensive operations associated with research, development, and engineering experimental work.

To summarize, research, development, and engineering experiments are often carried out in isolated technology islands. Each island can have its own hardware, with or without controlling software, and each software system can have its own data content and data structure. Therefore, carrying out science and engineering experiments can be quite time consuming and resource intensive, and each manual operation required to transfer data across platforms is prone to error. Currently, no overarching automation technology exists that can bring together all the individual activities and elements under a single integrated-technology platform that is adapted to multiple devices, instrument platforms and data systems. As a result, current software solutions are not able to automatically address instrument differences in order to allow for creation and dissemination of workflow automation templates. Therefore, there is a need for a software system that provides an overarching automation technology for scientific experimentation.

The present invention addresses such a need.

SUMMARY OF THE INVENTION

A system for automating experimentation is disclosed. The system comprises an automated experimentation platform (AEP) with a device setup interface that imports device setup and control definitions and allows user configuration and editing of the definitions, an experiment setup interface that is dynamically configurable to specific experiment types and their target instrument platforms and devices, and allows user final configuration and editing of all experiment setup settings, a reporting setup interface that dynamically builds reports from data and results and allows user configuration and editing of the reports, a design of experiments (DOE) engine that generates statistically valid and rigorous scientific experiments and sampling plans tailored to the target devices, including any software program for controlling the devices (ICP); and a generalized exchange module (GEM) for automating data exchanges between the AEP and one or more target applications and for enabling the data exchange to be generic.

Through the use of the automated experimentation platform (AEP) and generalized exchange module (GEM) data exchange is automatically provided between the DOE engine and the instrument, device, or ICP; and through the generalization of the exchange module the data exchanges can be adapted to any external software application, instrument, device, or ICP. Therefore, configuring of any scientific experiment type, control of any instrument or device, reporting of any data and results, and data exchanges between external software applications, instrument platforms, and devices can be achieved by the AEP and GEM automation components of the invention.

DETAILED DESCRIPTION

Abbreviations and Acronyms

Figure 1:
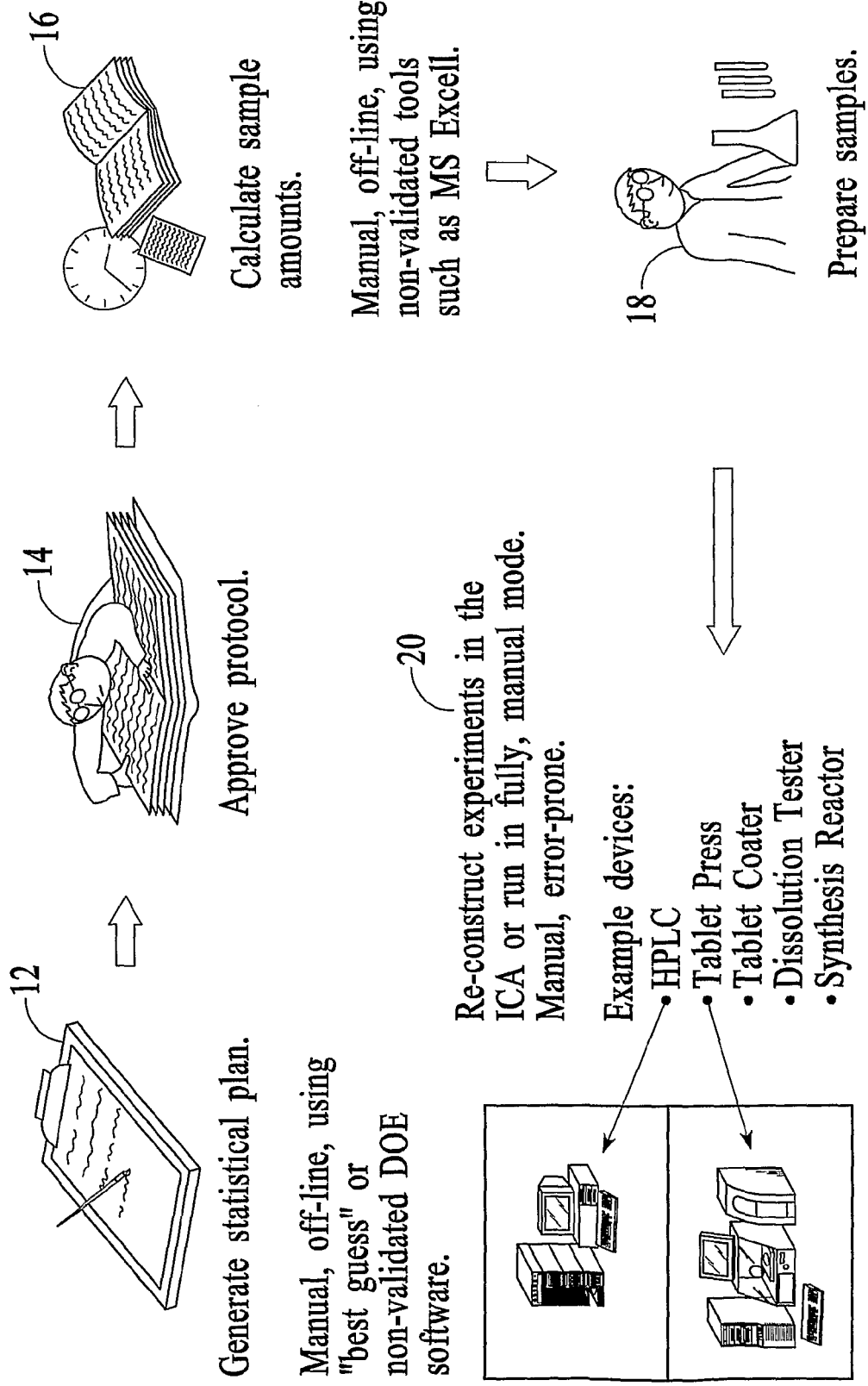
FIG. 1 illustrates the manual tools and operations involved in designing a research, development, or engineering experiment.
Figure 2:
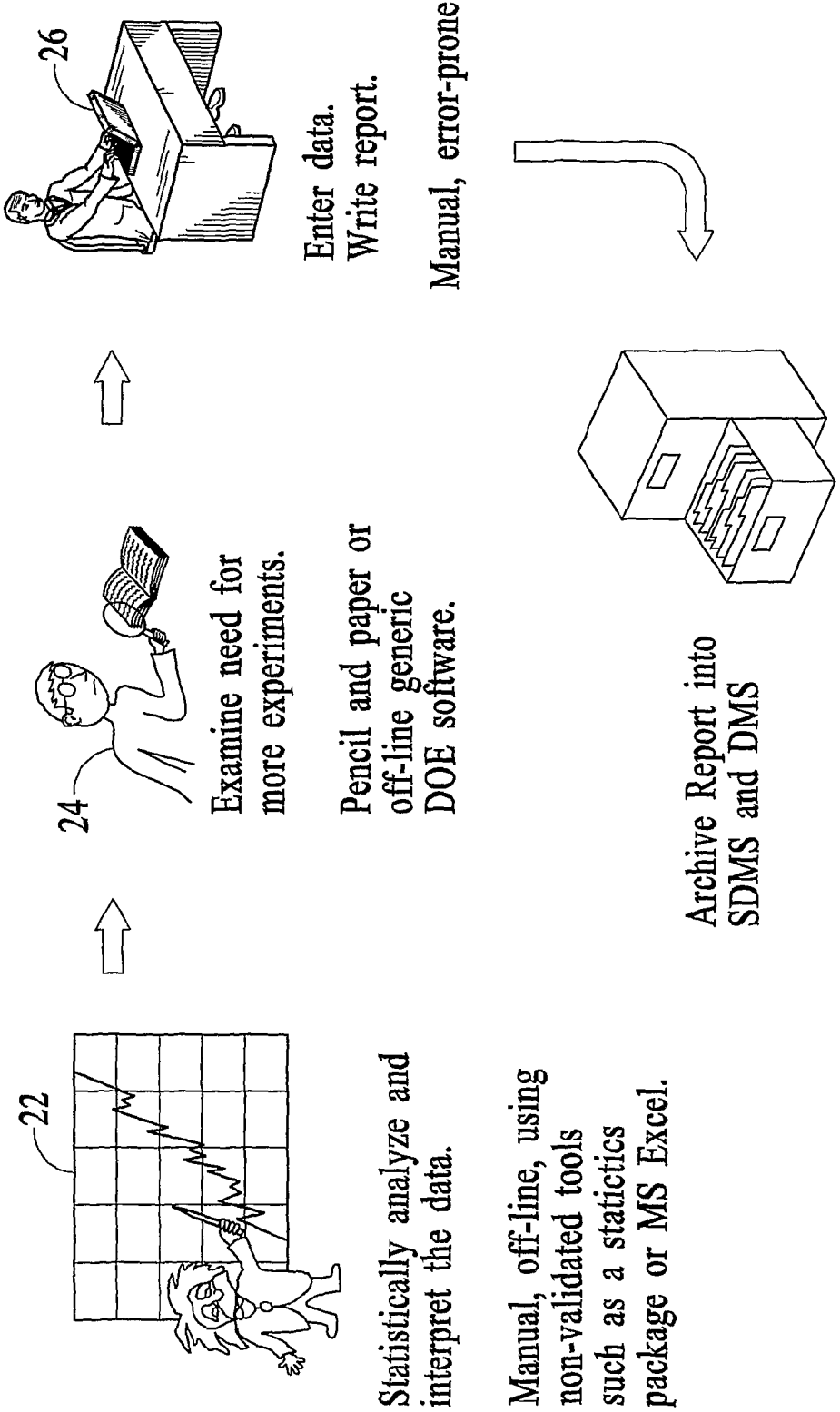
FIG. 2 illustrates the manual tools and operations involved in analyzing the data and reporting the results of a research, development, or engineering experiment.

AEP—Automated Experimentation Platform.

CDS—Chromatography Data System. A traditional name for an ICP (see below) that controls and handles the data from HPLC and GC instruments (see below).

DOE—design of experiments

GEM—generalized exchange module.

Device—An instrument, piece of equipment, or apparatus. Examples include but are not limited to analytical instruments, weighing and measurement devices, sampling and sample handling equipment, and processing equipment.

FDA—United States Food and Drug Administration.

GC—Gas Chromatography. An instrument-based quantitative analytical technique. GC instruments are widely used as research and development and quality assurance tools in many industries (e.g. pharmaceuticals, biotechnology, and petrochemicals).

HPLC—High Performance Liquid Chromatography. An instrument-based quantitative analytical technique. HPLC instruments are widely used as research and development and quality assurance tools in many industries (e.g. pharmaceuticals, biotechnology, and petrochemicals).

ICH—International Conference on Harmonization of Technical Requirements for Registration of Pharmaceuticals for Human Use.

ICP—instrument control program. The software program that operates a device.

Programmatic Interface—A software based communication channel that allows software programs to exchange instructions and data.

SDK—Software Development Kit. An SDK is a published programmatic interface for a device or a device's ICP.

XML—eXtensible Markup Language. A metalanguage written in SGML that allows one to design a markup language, used to allow for the easy interchange of documents on the World Wide Web.

XML Schema—XML Schemas express shared vocabularies and allow machines to carry out rules made by people. They provide a means for defining the structure, content and semantics of XML documents.

XSL—eXtensible Stylesheet Language. A language used to construct style sheets for an XML, consisting of two parts:
1. XSL Transformations (MLT). A language for transforming XML documents.
2. XSL Formatting Objects (XSL FO). XML vocabulary for specifying formatting semantics.

XSL Transformation—The set of XSL templates applied to XML data to transform it into another format.

XSL File—The file that contains the XML Transformation.

XSD File—XML Schema Definition is a language for specifying the grammar of the markup allowed in an XML file. Such a specification is called a schema and typically has a file extension of XSD.

The present invention relates generally to scientific research, development, and engineering experiments and more specifically to providing a system for automated experimentation. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention provides for full automation of research, development, and engineering experimental work. The present invention provides for:

1. Creating and exchanging device setup and control definitions, experiment type definitions, analysis definitions, reporting definitions, and user addressable configuration and control of the definitions.

2. An experiment setup interface that dynamically configures to specific experiment types and their target instrument platforms and devices.

3. Automating data exchange between a design of experiments (DOE) software engine and any targeted software application, instrument, device or ICP.

4. Making the data exchange technology generic and adaptable to any targeted software application, instrument, device, or ICP.

To describe the features of the present invention in more detail, refer now to the following description in conjunction with the accompanying Figures.

Overview

An automated experimentation (AE) system in accordance with the present invention is a proprietary software platform for automated experimentation. In a preferred embodiment, the AE system comprises a software program with statistical and mathematical informatics engines for:

Design of experiments (common abbreviations: DOX, DOE)
Numerical data analysis
2D, 3D, and 4D (trellis) visualization graphics
Multiple response optimization
Formal reporting The AE system also includes tools for regulatory (FDA, ICH) compliance, workflow management control, application-specific experimentation, and file-less data exchange with targeted software applications, instruments, devices, or ICPs.

The AE system exports experiment designs to targeted software applications, instruments, devices, or ICPs as ready-to-run experiments in the native file and data formats of the target, imports all results from the target, analyzes and graphs the results, and creates presentation quality reports.

In a currently available example embodiment the AE system's strategic features include:

E-lab Notebook Interface—Document style interface displays reports in HTML windows. Encrypted database file format contains OLE objects for embedding a Microsoft® Word™ document and Microsoft Excel™ workbook. Externally generated graphics can be imported and embedded into all reports.

Full 21 CFR 11 Compliance Support—Includes e-signature controls for all data entry and exchanges, full audit trail, and event logging.

Analysis and Reporting—Application-specific automated statistical analysis, graphing, and reporting.

Acceptance Criteria Testing—Embedded analytics automatically compare actual results with user entered "pass/fail" acceptance criteria.

Workflow Management—Construct and export work templates. Permissions and authorities control of all work.

In the pharmaceutical and biotechnology industries, current embodiments of the AE system are utilized in the mission-critical activities within analytical R&D, chemical entity development (CED), chemistry development (CRD), process R&D, formula R&D, and manufacturing QA.

Figure 3:
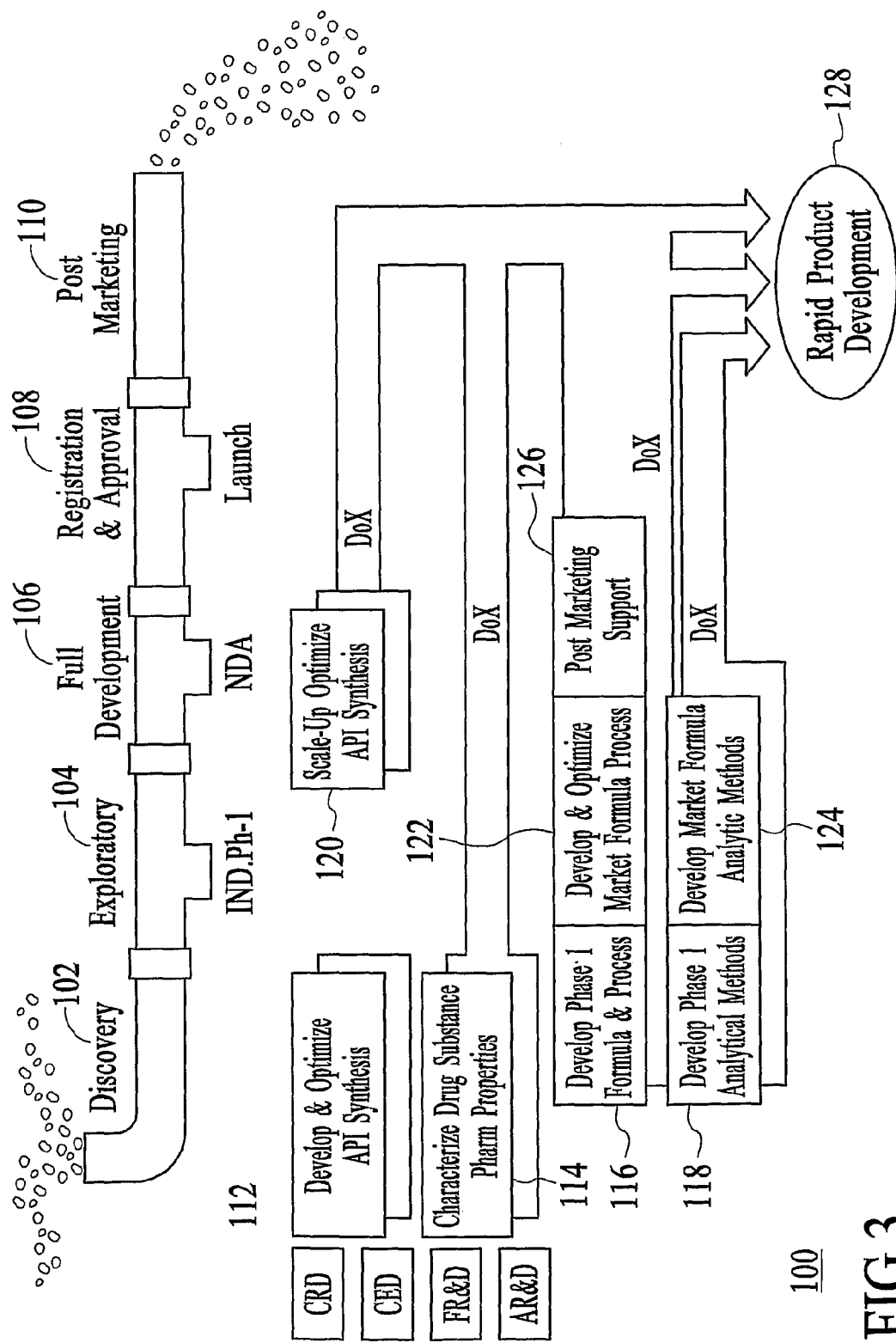
FIG. 3 illustrates some of the R&D activities in the pharmaceutical drug development pipeline as one target application area that can be utilized with an automated experimentation system in accordance with the present invention.

FIG. 3 is a diagram that illustrates the R&D activities in the pharmaceutical drug development pipeline that utilize or can benefit from statistical design of experiments (DOE) methodologies 100, and so can utilize the AE system in accordance with the present invention. As is seen, in this type of methodology, first there is a discovery phase 102. Next, an exploratory phase 104 takes place. Following completion of the exploratory process is a full development phase 106. When the full development phase 106 is completed, registration and approval processes 108 follow, and then a post marketing phase 110 ends the drug development activity.

There are several elements in each step 102-110 of the methodology 100. The discovery phase 102 contains a develop and optimize API synthesis process element 112 and a characterize drug substance pharmaceutical properties process element 114. The exploratory phase 104 includes the develop of Phase 1 formula and process 116 and the develop of Phase 1 analytical methods process elements 118. The full development phase 106 includes the scale-up/optimize API synthesis 120, the develop and optimize market formula 122, and the develop market formula analytic methods 124 process elements. Finally, the registration and approval 108 and post marketing 110 phases include the post marketing support 126 process elements. The use of statistical design of experiments (DOE) methodologies in these phases and process elements acts to speed up product development 128.

Figure 4:
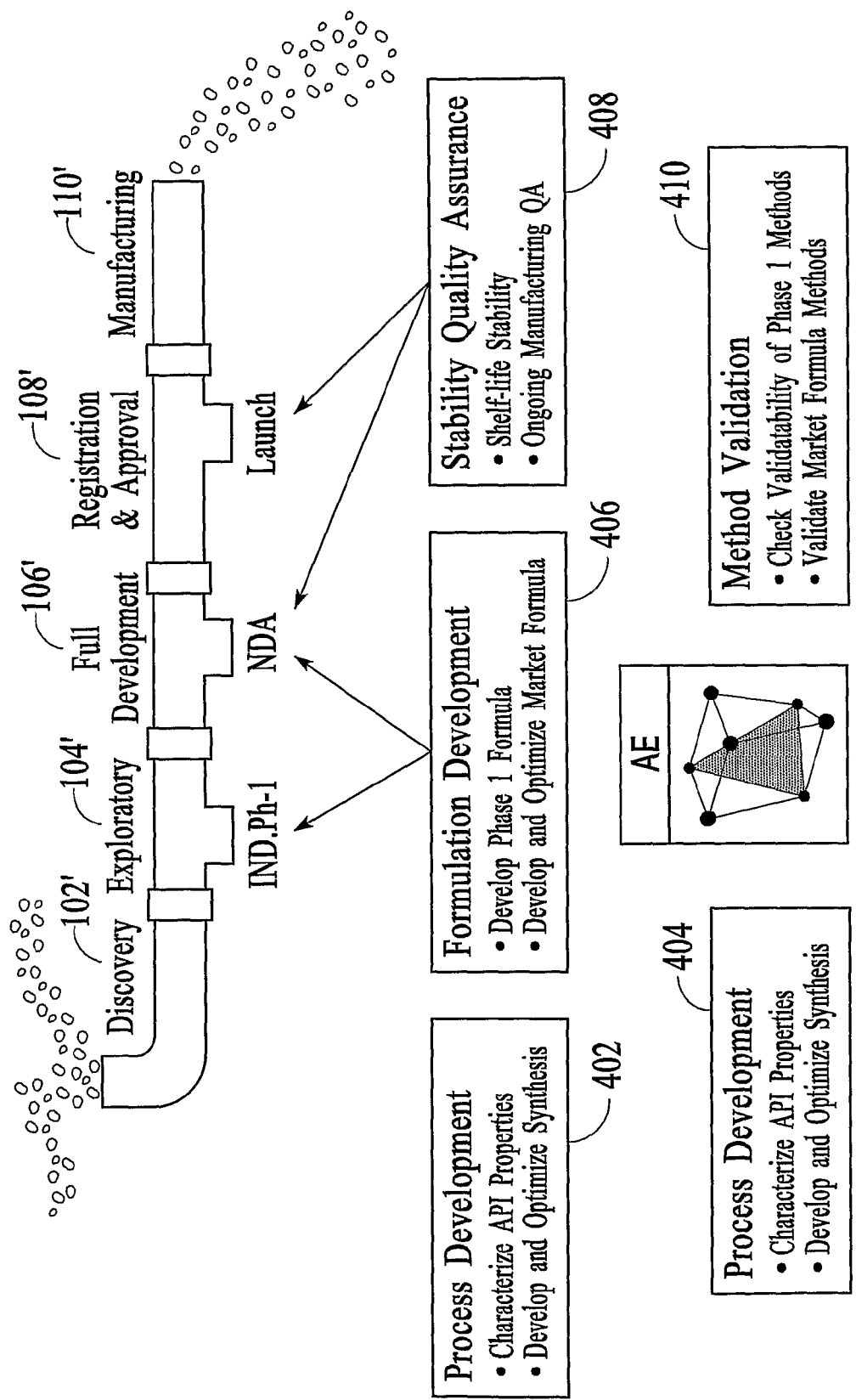
FIG. 4 shows some of the specific pharmaceutical drug development pipeline activities that can utilize the automated experimentation system as one target application area using an example embodiment in accordance with the present invention.

FIG. 4 shows the specific drug development pipeline activities that can utilize an AE system in accordance with the present invention. The activities can be represented as custom application modules of the AE system. These application modules can be independently developed and imported directly into the AE system. Currently developed application modules for one embodiment of the AE system are used for the development and FDA validation of chromatographic analytical methods used to measure the amount, purity, and stability of manufactured drug substances (active compounds and impurities) and drug products (final consumer-deliverable dosage forms—tablets, capsules, gelcaps, etc.).

More specifically, current application modules and those under development for one embodiment of the AE system include the following:

A process development module 402, which characterizes API properties and develops and optimizes drug substance synthesis and drug product manufacturing processes.

A method development module 404, which develops and optimizes analytical methods used in all drug development pipeline activities.

A formulation development module 406, which develops Phase 1 formula and develops and optimizes market formulas.

A stability and quality assurance module 408, which assures shelf-life stability and ongoing manufacturing quality assurance.

A method validation module 410, which validates the fitness for use of analytical methods used in all drug development pipeline activities.

Modules 402, 404, 406, 408 and 410 operate in conjunction with the AE system and perform various functions in coordination with the methodologies of discovery 102', exploration 104', full development 106', registration and approval 108' and post-marketing 110' as discussed in FIG. 3 above.

Accordingly, the AE system in an example embodiment of the present invention is a software system which utilizes custom application modules for the targeted design of experiments and the analysis, graphing, optimization, and reporting of experimental data and results in support of all drug development pipeline activities.

The AE system imports Device Driver XML files (Device XMLs) generated outside of the AE system according to a public Schema, for example an XML schema. Device XMLs contain the data that enables the AE system to set up experiments and address, control, and exchange data with one or more devices. These XML files contain the instructions that allow the AE system to address the existing interface of one or more devices or their controlling ICPs.

User generated Device XMLs enable the AE system to address and control any instrument platform, component module, or device via any public or private programmatic interface that the platform module, or device contains. No programming need be developed to adapt the existing interface of an external software program, device, or ICP to the AE system.

The AE system utilizes experiment type XML files (Experiment XMLs) generated outside of the AE system according to a public Schema, for example an AE XML schema. The experiment XMLs contain the data that enable the AE system to dynamically configure the experiment setup interface to address the specific experiment type and its target devices. The AE system automatically applies an experiment setup builder XSL to the experiment XML and the device XML to generate an experiment setup XML that complies with the AE XML Schema. No programming need be developed to adapt the experiment type to the AE system. An AE graphical user interface (GUI) builder transforms experiment type settings descriptions and device descriptions into AE's dynamically configurable AE DOE GUI. The GUI displays all experiment type settings along with device control points, constraints, and graphical images of each control point, for final refinement. The AE DOE GUI enables construction of statistically designed experiments for automatic execution on the device using the final experiment type and device settings description.

The AE system utilizes analysis template XML files (Analysis XMLs) generated outside of the AE system according to a public Schema, for example an AE XML schema. The analysis XMLs contain the data that enables the AE system to dynamically select and sequence the analysis routines from its internal analysis library that are applied to data and results to generate an analysis results set template specific to the experiment type, the user requirements, and the area of application. The analysis results set can be automatically available to any report by including it into the report XML. No programming need be developed to adapt analysis templates to the AE system. An AE analysis builder transforms analysis routine and sequence settings descriptions into AE's dynamically configurable data analyzer GUI. The GUI displays all routine and sequence settings for final refinement. The data analyzer GUI enables automatic data analysis on the AE System using the final analysis settings description.

The AE system utilizes report template XML files (Report XMLs) generated outside of the AE system according to a public Schema, for example a AE XML schema. The Report XMLs contain the data that enables the AE system to dynamically configure the reporting engine to generate a report specific to the experiment type, the user requirements, and the area of application. No programming need be developed to adapt report templates to the AE system. An AE report builder transforms analysis report data and results complement and sequence settings descriptions into AE's dynamically configurable reporter GUI. The GUI displays all complement and sequence settings for final refinement. The reporter GUI enables automatic report generation on the AE System using the final report settings description.

The public XML schema enables the user to update, add to, remove, or otherwise modify the device XMLs, experiment XMLs, analysis XMLs, and report XMLs created for external software applications, instrument platforms, devices, or ICPs at any time to dynamically address changes to the target application platform, device, or ICP.

In addition, in a preferred embodiment, the AE system includes a variety of plug-in application modules—each of which generates specific types of statistically-based experiment designs as directed by experiment type XMLs and device XMLs, and executes the associated analysis, graphing, optimization, and reporting of the experiment's results, as directed by analysis XMLs and report XMLs. The user could configure and direct the application modules, for example, in a preferred embodiment, by constructing device XMLs, experiment XMLs, analysis XMLs, and report XMLs, and operate the application module tools through a series of rule-based wizards.

AE system application modules can address a wide variety of different application areas. For example, one application module is used for chromatographic analytical instrument method development while another is used for synthetic chemistry process development.

The device XMLs of the AE system also preferably contain the data that enables the AE to address, control, and exchange data with various independently conceived and separately designed target software applications, instrument platforms, devices, and ICPs via any public or private programmatic interface that the target contains.

The AE system in a preferred embodiment is an electronic signature based system for enabling software operations and subroutines and imposing management review and approve loops on user work within the AE system.

The AE system generates statistical experiment designs or user constructed experiments that can be run on the target instrument, directly or via the instrument's controlling ICP. The AE system communicates the experiments to an instrument's controlling software via file-less data transfer using the instrument's public or private programmatic interface.

In addition, driver XML files of the AE system contain several layers of data regarding constraints on controllable instrument parameters, including:

Absolute constraints: achievable setting limits.
Manager constraints: restrictions on setting limits due to current state or required practice.
Analyst constraints: restrictions based on current experiment considerations.

The AE system includes an automated experimentation platform (AEP) and a generalized exchange module (GEM) to provide a unified software platform for use in automating experiments. To describe the features of GEM and its interaction with the other AE system elements refer now to the following description in conjunction with the accompanying Figures.

Overview—Generalized Exchange Module (GEM)

The generalized exchange module (GEM) is a proprietary software-based technology that enables a software program to dynamically configure its user interface and directly control a device and/or directly address the device's ICP—whether or not the device's target programmatic interface is published in an SDK. The level of control that can be provided by GEM is only limited by the level of device addressability provided by the device's programmatic interface. GEM accomplishes this through the following program elements:

GEM XML schema by which users can completely describe for any ICP:

All controllable elements of a device (modules and sub-modules).

Graphical images of each device element.

Individual control points of each device element.

Dependency relationships between elements and control points of a device.

Constraints (limits and other restrictions) on the allowable settings of control points.

Programmatic commands, addresses, and data paths for controlling the device.

Programmatic commands, addresses, and data paths for retrieving data from the device.

The following components are utilized in a preferred embodiment of a GEM:

An ICP importer that transforms an ICP's native device descriptions into GEM's native data structure.

A template importer that transforms experiment type settings descriptions, analysis settings descriptions, and report settings descriptions into the AEP's native data structure.

A GEM GUI builder that transforms device descriptions into GEM's dynamically configurable GEM ICP GUI. The GEM ICP GUI displays all device control points and constraints, including graphical images of each control point for further refinement and restriction of the device description.

A design of experiment (DOE) exporter that writes the control point settings of the statistical experiment design or user constructed experiment to the device.

A DOE importer that reads experiment result output data from the described device.

Function of GEM

Transforming an ICP's native device descriptions into GEM's native data structure.

Displaying all device control points and constraints, including graphical images of each control point via a configurable ICP user interface.

Transforming experiment type, analysis, and reporting settings descriptions into the AEP's native data structure.

Indirect or direct control of a device and/or direct addressability of the device's ICP whether or not the device's target programmatic interface is published in an SDK.

Writing control point settings to a device or the device's ICP as ready-to-run experiments in native file and data formats using file-less data transfer protocols.

Reading data from a device or the device's ICP using file-less data transfer protocols.

Converting a user analysis template into a customized analysis template that auto-completes when the data are automatically retrieved from a device or the device's ICP via a dynamically configurable reporting interface.

Converting a user reporting template document (Microsoft Word, RTF, TXT, or HTML) into a customized reporting template that auto-completes when the data are automatically retrieved from a device or the device's ICP via a dynamically configurable reporting interface.

AEP with GEM—Operational Flow Diagram

Figure 5:
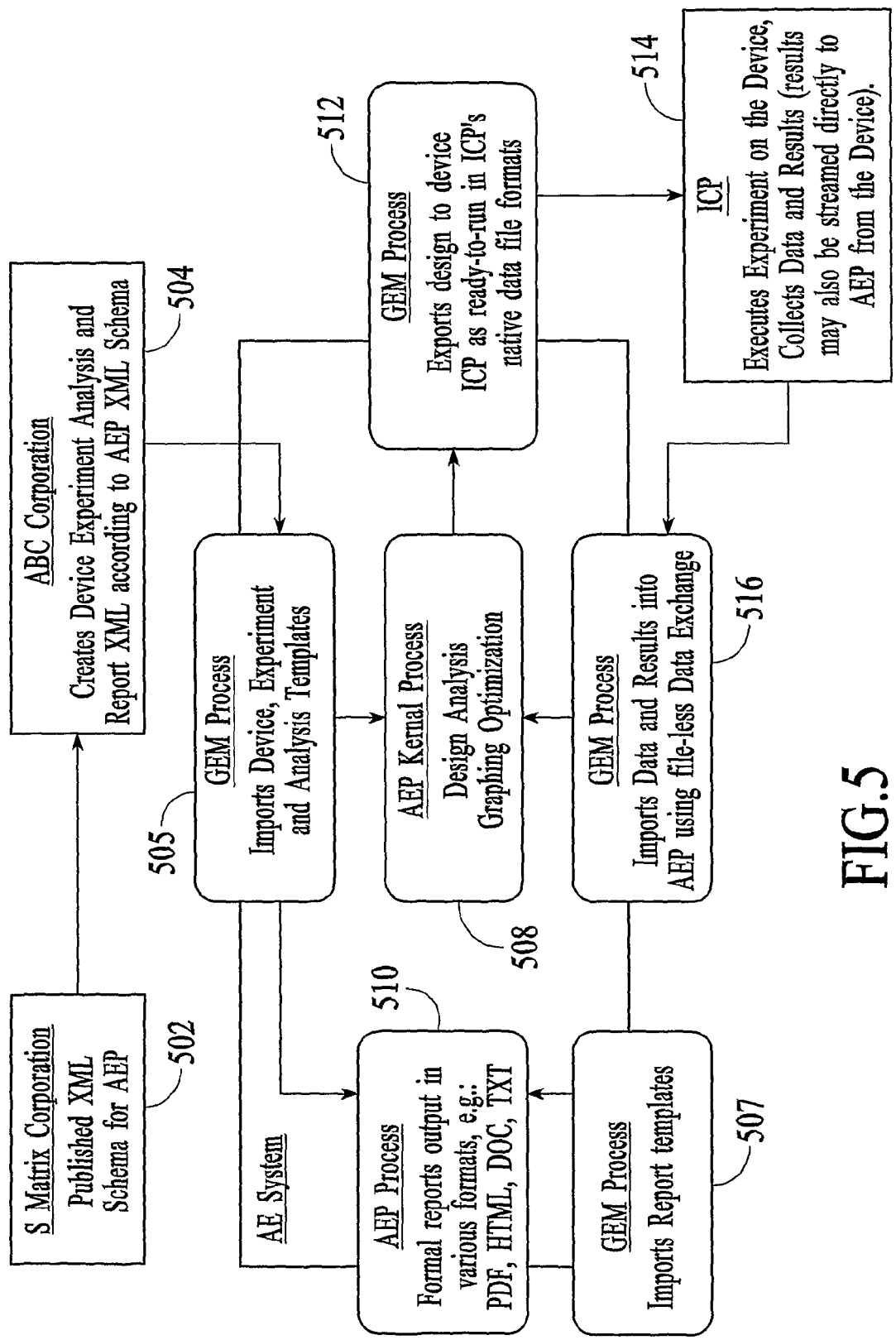
FIG. 5 provides automated experimentation platform (AEP) and a generalized exchange module (GEM) operational flow diagram (1) illustrating XML exchange with a third-party company, and (2) resulting in AEP process flows with an instrument control program (ICP).

FIG. 5 presents an AEP and GEM operational flow diagram illustrating (a) XML exchange with a third-party company, and (b) resulting AEP and GEM process flows with the instrument company's ICP. Referring to FIG. 5, the flow diagram illustrates that company 1 (S-Matrix Corporation) publishes XML schema for the AE system, via step 502. Then a device company, for example, ABC Corporation, creates experiment, analysis, and reporting settings AE XMLs and device description ICP XMLs according to the AE system XML schema, via step 504. A GEM process imports device, experiment and analysis templates, via step 505. A GEM process imports report templates, via step 507. The AEP kernel process carries out design, analysis, graphing and optimization, via step 508. The GEM process then exports design to the ICP as ready-to-run in ICP's native data/file formats, via step 512. The ICP executes the desired experiment on the instrument, and collects results data (results may also be streamed directly to AE system from the device), via step 514. The ICP then sends the data and results to the GEM process, which imports the data and results to the AE system using file-less data exchange, via step 516. The AEP kernel processes carry out analysis, graphing and optimization, again via step 508. The AEP process then produces formal reports output in various formats, e.g., PDF, HTML, DOC and TXT, via step 510.

AEP with GEM—Software Installation Configurations

Figure 6:
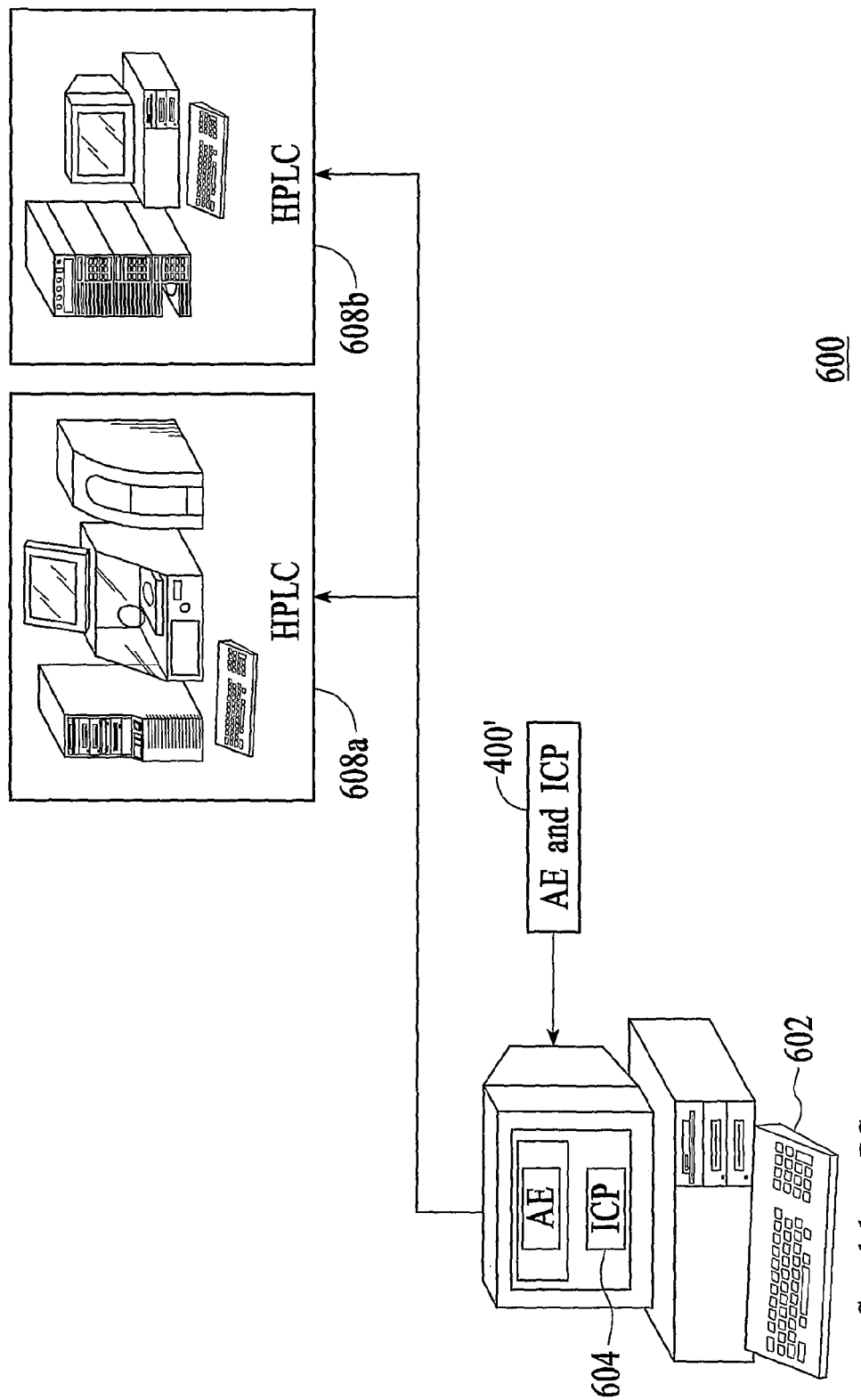
FIGS. 6-8 show different software installation configurations of an automated experimentation system with an ICP.
Figure 7:
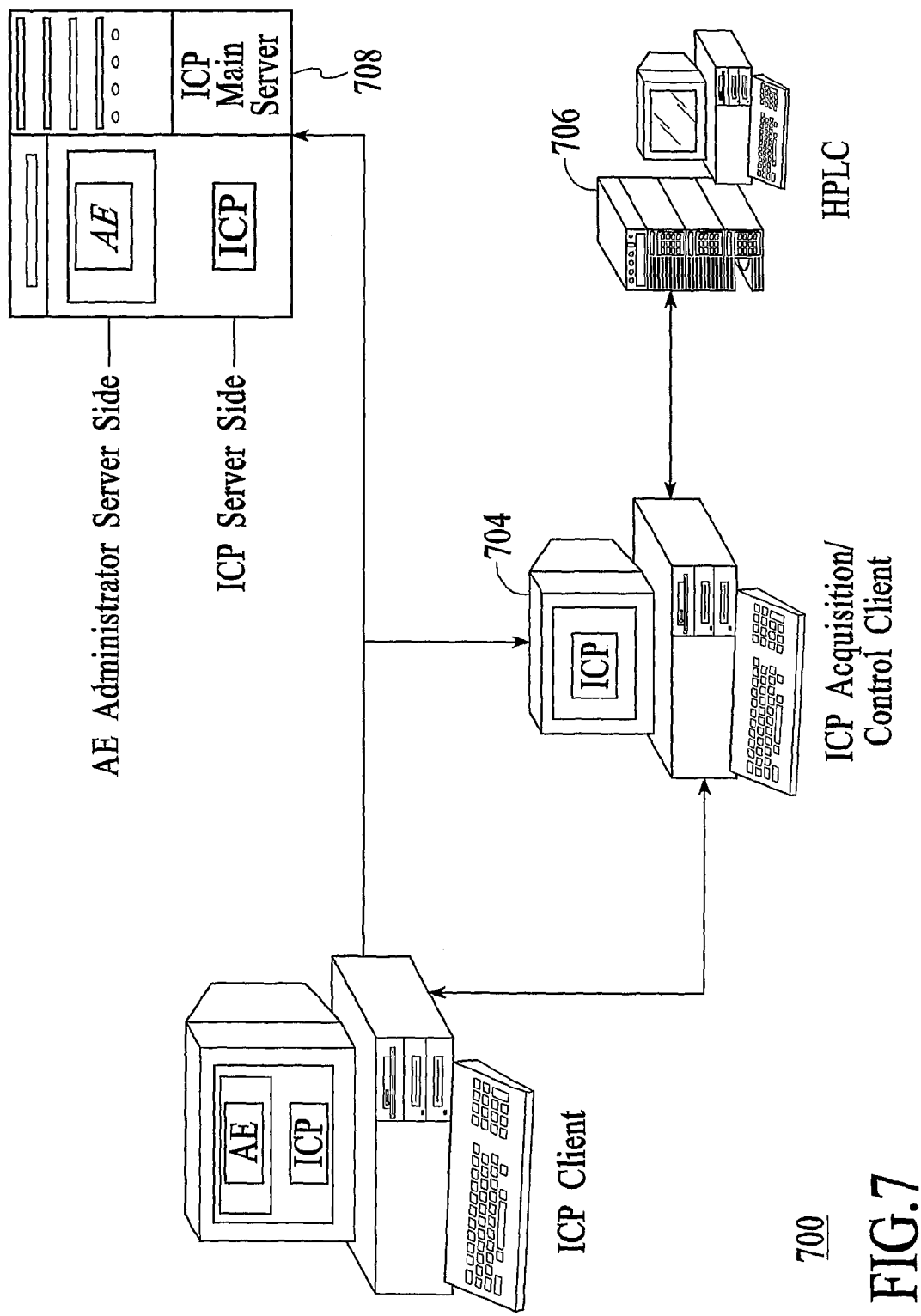
Figure 8:
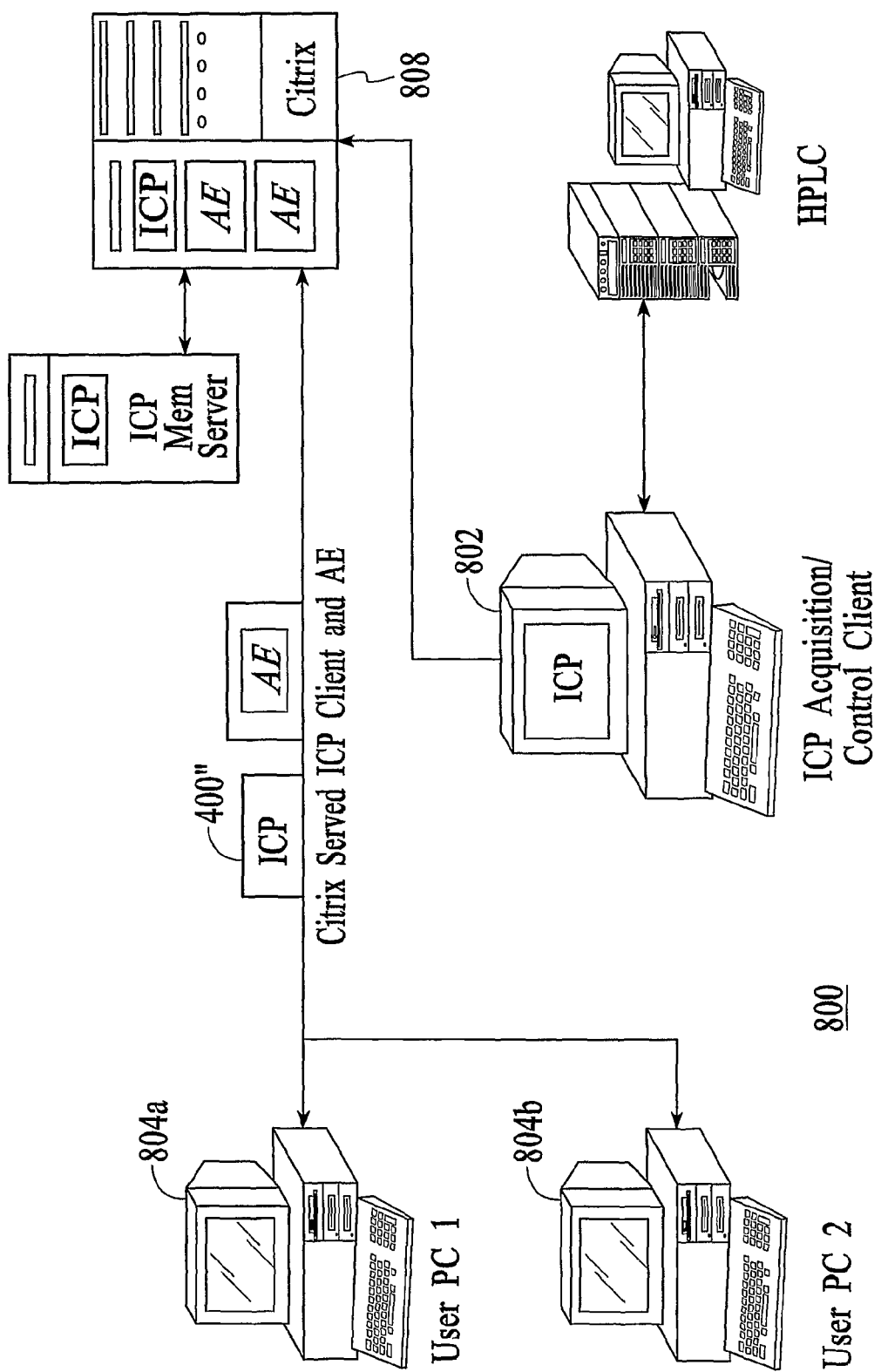

FIGS. 6-8 show different software installation configurations of the AE system (AEP and GEM) with an ICP. FIG. 6 shows a standalone workstation configuration 600. The standalone workstation configuration 600 includes a standalone PC 602 linked to the ICP 604, the servers 608a and 608b, and the AE system and ICP 400'. FIG. 7 shows a network configuration 700 in which the ICP is a Client/Server (C/S) application 704, linked to the ICP main server 708 and to another server 706. FIG. 8 shows an alternative network configuration 800 in which the ICP is a C/S application 802 and both the AE system and the ICP 400" are served to user PCs 804a and 804b via a client application such as the Citrix® MetaFrame application 808.

Accordingly, AEP and GEM cooperate to automate the formerly manually intensive research, development, and engineering experiments. To illustrate this in more detail refer now to the following discussion which is based on one target application area using an example embodiment in accordance with the present invention in conjunction with the accompanying figures.

Figure 9:
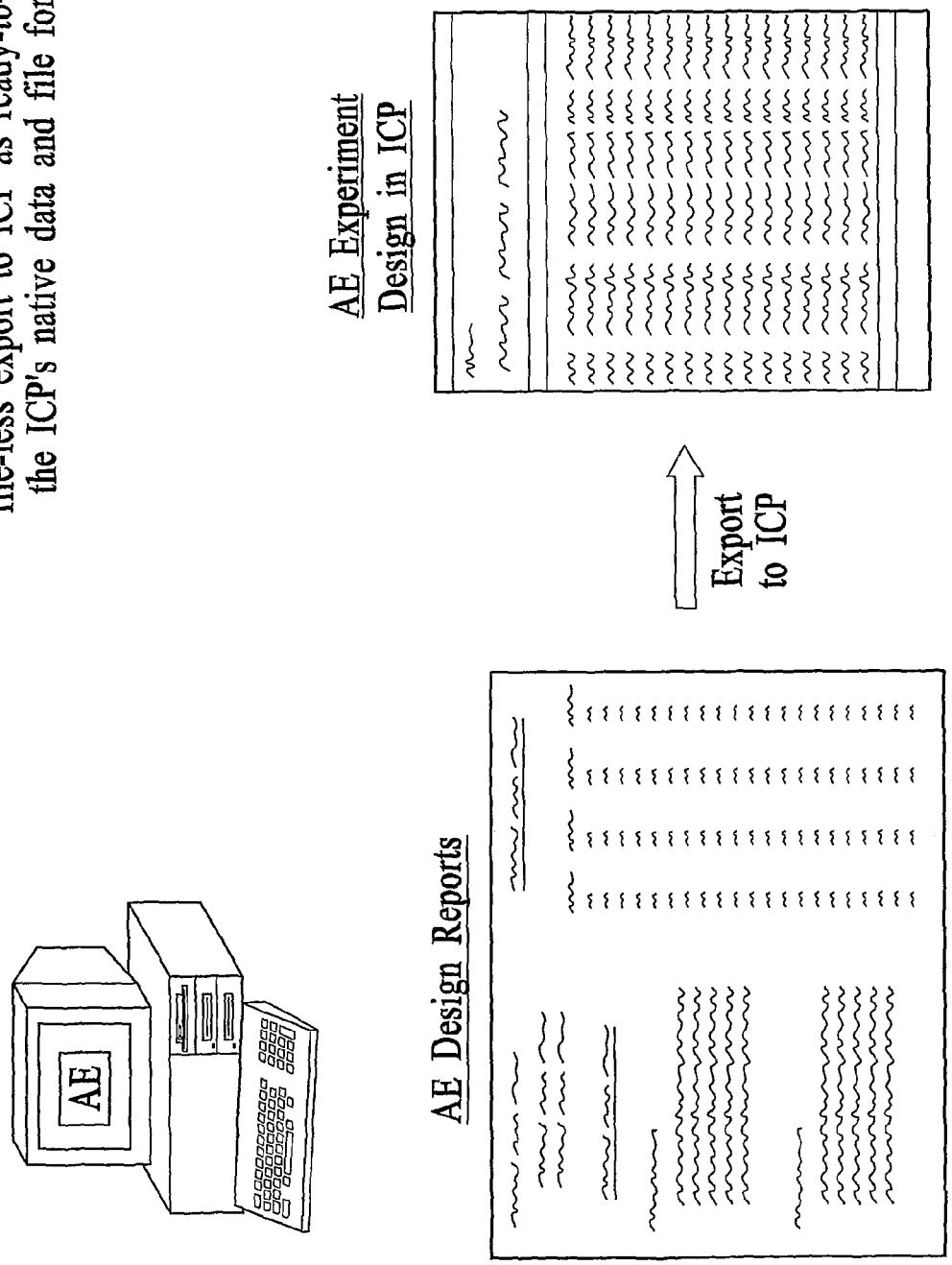
FIG. 9 illustrates the research, development, or engineering experiment workflow previously presented in FIG. 1 adapted to an HPLC method validation experiment created within the automated experimentation system and automatically transferred to an instrument's ICP.
Figure 10:
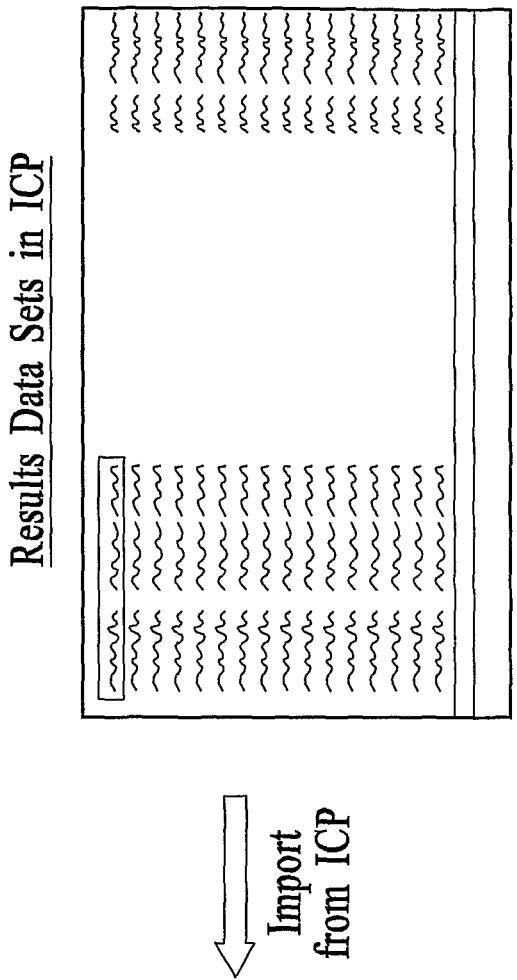
FIG. 10 illustrates the research, development, or engineering experiment workflow previously presented in FIG. 2 adapted to an HPLC method validation experiment in which the results are generated by the ICP and automatically imported into the automated experimentation system for automated analysis graphing, and reporting.
Figure 10:
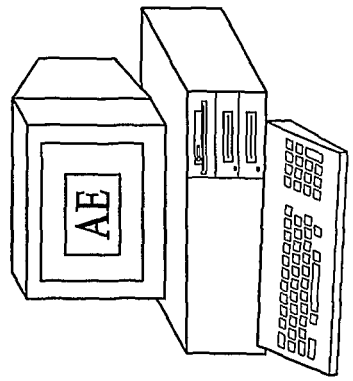

FIG. 9 illustrates the research, development, or engineering experiment workflow previously presented in FIG. 1 adapted to an HPLC method validation experiment created within the AE system's central software environment and automatically transferred to an instrument's ICP. This provides for an automated experiment construction and file-less export to ICP as ready-to-run in the ICP's native data and file formats. FIG. 10 illustrates the research, development, or engineering experiment workflow previously presented in Figure w, but again carried out within the AE system's central software environment. This provides for automated experiment running and file-less import from ICP as completed results data sets. The AE system provides an integrated framework to carry out all the required experiment activities without manually transcribing experiments or manually transferring data between environments.

To maintain data exchange security, the AE system in a preferred embodiment contains a complete 21 CFR 11 (Title 21, Part 11, Code of Federal Regulations) Regulatory Compliance feature set that enables maintenance of regulatory compliance across technology platforms. Example regulatory compliance features include:

E-signature controls for data exchanges between instrument platforms.

Full audit trail and event logging for all user/software operations.

Automated e-Review and e-Approvals.

Full audit trail and event logging for all data events and reports.

In addition, the AE system provides a complete workflow management feature set that enables construction of work templates and software-based administration and control of the work. Example workflow management features include:
- Ability to create and distribute workflow templates.
- Control of feature/function access with user permissions and authorities settings.
- Control of workflow with review and approve e-signing control loops.
- E-signature control of all data exchanges with ICPs.

Figure 11:
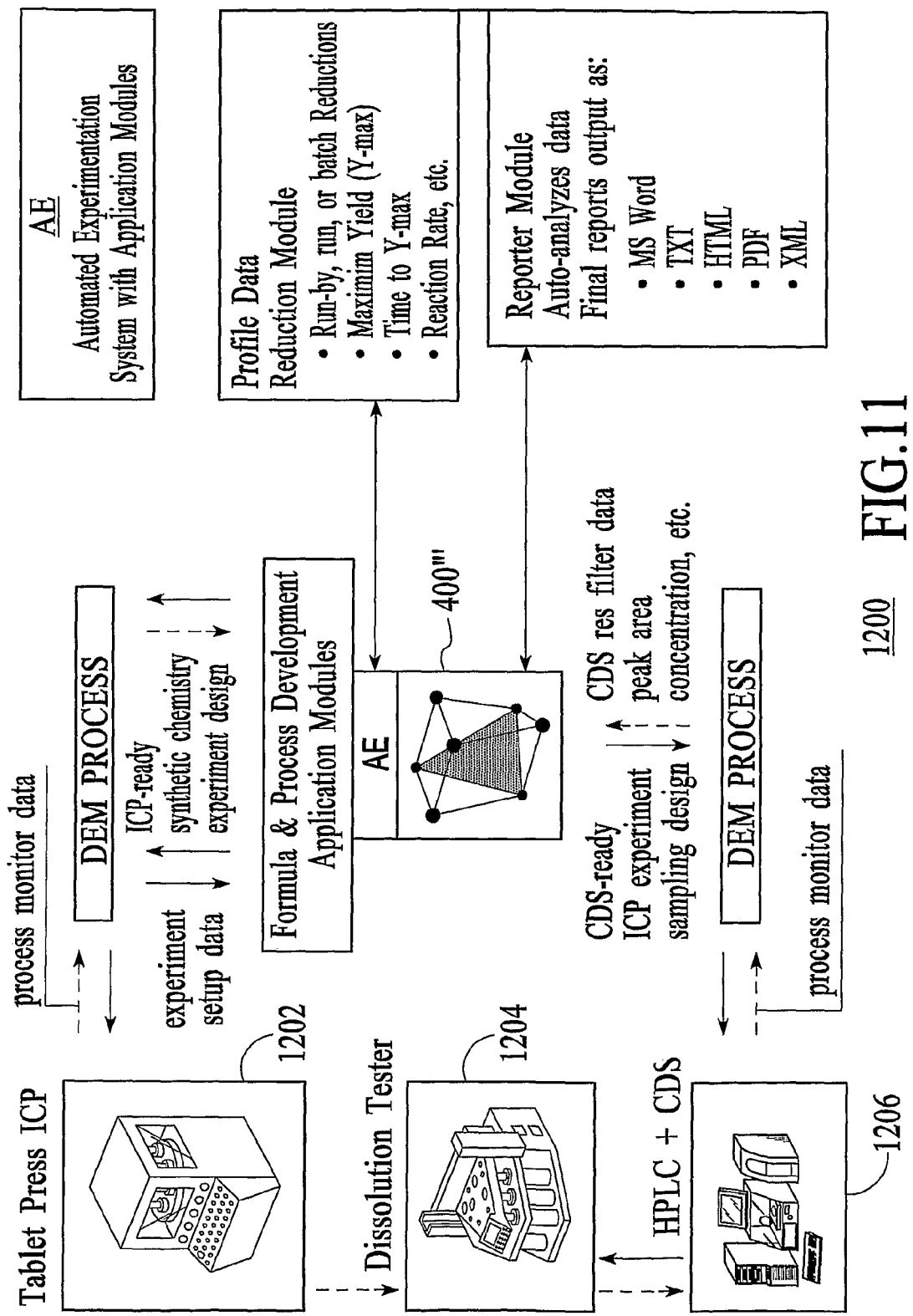
FIG. 11 shows data flows between the automated experimentation systems and various experiment instrument devices.

FIG. 11 presents a more complex pharmaceutical experiment platform 1200. The figure illustrates how the AE system 400''' could integrate three separate devices used in an experiment: a tablet press 1202, a dissolution tester 1204, and an HPLC System 1206. The tablet press 1202 compresses a drug combined with various powdered pharmaceutical ingredients into drug tablets. The dissolution tester 1204 simulates how the tablets will dissolve in the stomach or intestines. The HPLC 1206 samples the dissolution tester 1204 at defined intervals and measures the samples to determine how quickly the tablet dissolves and releases the drug.

Pharmaceutical scientists use this experiment platform to determine the combination and formulation of the powdered ingredients and the tablet press operating conditions which will give them a tablet that releases the drug in the required time interval at the required release rate. The workflow steps in FIG. 12 involve the following automated experimentation operations:
- Experiment design for studying powdered ingredient formula and process effects (e.g. pressure, speed) generated within the AE system.
- Experiment design transferred directly to the ICP controlling the tablet press 1202 as ready-to-run in the native file and data formats of the ICP 1206 using file-less data exchange and e-signature control.
- Coordinated sample processing design transferred directly to the ICP controlling the dissolution tester (in this case the CDS) as ready-to-run in the native file and data formats of the CDS 1206 using file-less data exchange and e-signature control.

In this example the dissolution tester 1204 is controlled by the CDS 1206, which also controls the HPLC instrument. Alternatively, the sample processing design could be transferred to an independent ICP controlling the dissolution tester.
- Coordinated sample testing design transferred directly to the CDS (the HPLC instrument's ICP) as ready-to-run in the native file and data formats of the CDS using file-less data exchange and e-signature control.
- Experiment results transferred directly from the CDS to the AE system using file-less data exchange and e-signature control.
- Fully automated analysis, graphing, and final report development done within the AE system.
- Final reports output in the file formats required for the document archiving system.

Figure 12:
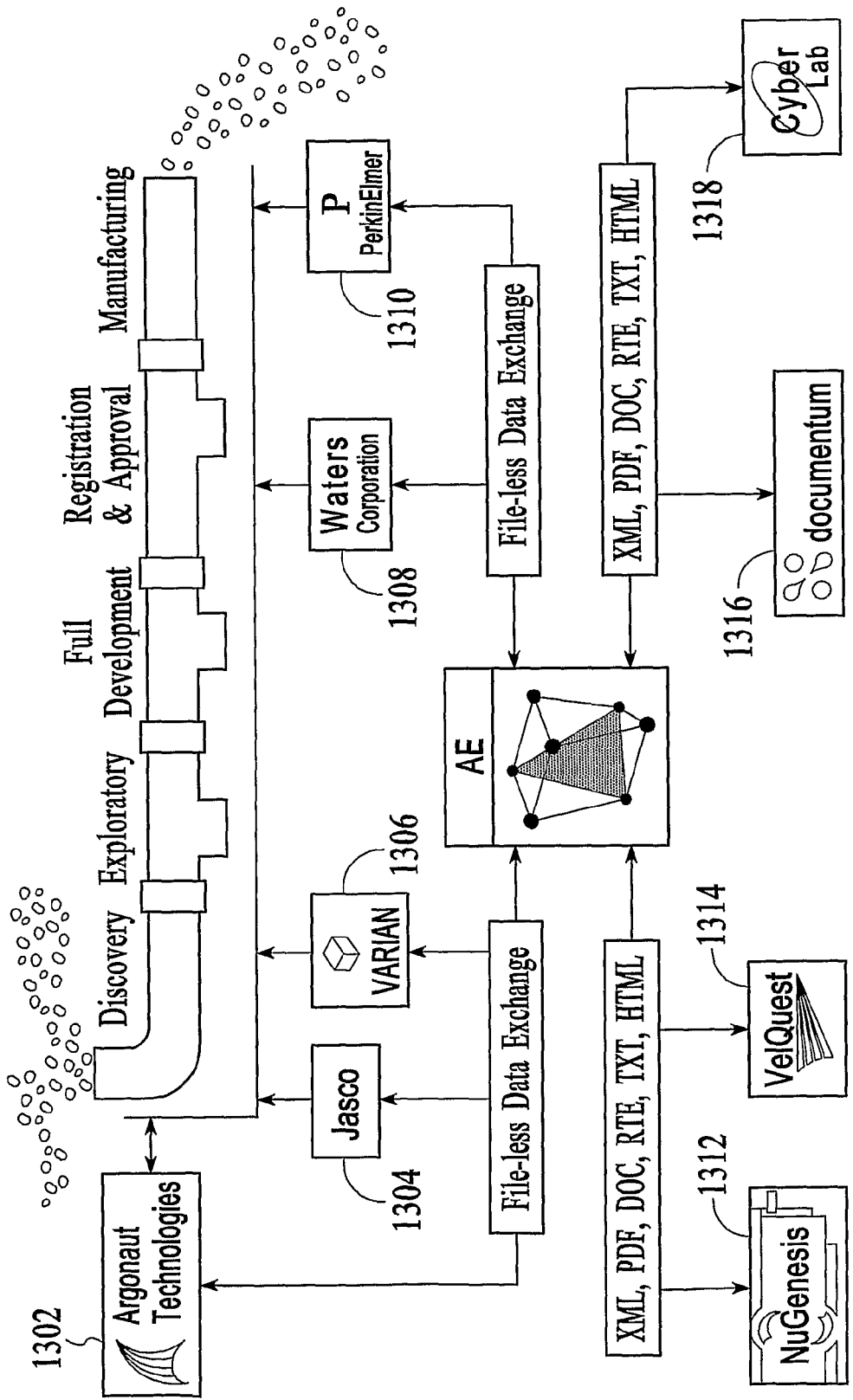
FIG. 12 is a higher-level view of the automated experimentation system connecting many common external software applications and ICPs (using file-less data exchange) across the drug development pipeline as one target application area using an example embodiment.

FIG. 12 is a higher-level view of the AE system 400''''; here the AEP system is shown connecting many common ICPs (using file-less data exchange) across the drug development pipeline, including those offered by Argonaut Technologies, Inc. (recently acquired by Biotage AB) 1302, Jasco Inc. 1304, Varian, Inc. 1306, Waters Corporation 1308 and PerkinElmer, Inc. 1310. The figure also shows the AEP system exchanging data and documents with many common enterprise data management and document management software systems, including those offered by NuGenesis Technologies Corporation (recently acquired by Waters Corporation) 1312, VelQuest Corporation 1314, Documentum, Inc. (recently acquired by EMC Corporation) 1316 and Scientific Software Inc. (CyberLab product—company recently acquired by Agilent Technologies Inc.) 1318. The figure serves to illustrate the power of the generalized data exchange capabilities that AEP with GEM technology provides.

CONCLUSION

A system and method in accordance with the present invention provides for full automation of research, development, and engineering experimental work and processes.

Through the use of the automated experimentation (AE) system experiment setup dynamically configures to defined experiment types and their involved instrument platforms and devices, and analysis and reporting dynamically configures to defined requirements and areas of application. Through the use of a generalized exchange module (GEM), definitions of experiment types, data analysis, and results reporting for specific experimental environments or areas of application, and setup and control of all involved instruments or devices, can be independently developed and imported without the need for programming. Data exchange is automatically provided between the experimental design, analysis, graphing, optimization, and reporting software engine elements of the AE system and targeted external software applications, instruments, devices, or ICPs; the data exchanges can be adapted to any target.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for automating experimentation, wherein the system includes a processor and a memory device coupled to the processor, the system further comprising:
    an automated experimentation platform (AEP) for automating one or more experimentation processes by dynamically configuring to defined experiment types and to associated instrument devices, wherein the AEP includes a design of experiment (DOE) engine that generates statistically designed experiments related to the defined experiment types and to the associated instrument devices; and
    a generalized exchange module (GEM) for automating data exchanges between the AEP and one or more target applications by importing and exporting data related to the defined experiment types and to the associated instrument devices without programming and for enabling the data exchanges to be generic, wherein the GEM includes both a design of experiment (DOE) exporter that writes control point settings of the defined experiment types to the associated instrument devices and a DOE importer that reads experiment result output data from the associated instrument devices.

2. The system of claim 1 wherein the one or more target applications include any of external software applications, devices, and instrument control programs (ICPs).

3. The system of claim 1 wherein the one or more experimentation processes comprises any of research, development, scientific and engineering processes.

4. The system of claim 1 wherein the generalized exchange module (GEM) comprises a plurality of processes for importing data from an independent company and providing the data in a generic language to a plurality of kernel processes of the AEP and importing and exporting data from a target application to and from the plurality of kernel processes using file-less data exchange.

5. The system of claim 1 wherein the GEM further comprises:
   an instrument control program (ICP) importer that transforms an ICP native device description into the GEM native data structure;
   a template importer that transforms experiment type settings descriptions, analysis settings descriptions, and report settings descriptions into the AEP native data structure;
   a GEM graphical user interface (GUI) builder that transforms the GEM native data structure device descriptions into a dynamically configurable GEM GUI;
   an experiment set up GUI that enables construction of experiments for automatic execution using a physical device description;
   a design of experiments (DOE) exporter that writes control point settings for the experimenter; and
   a DOE importer that reads experiment result output data from the device.

6. The system of claim 4 wherein the AEP comprises a plurality of kernel processes for generating designs, analysis results, and reports and a plurality of processes for constructing and interpreting report templates.

7. A computer-implemented method for automating experimentation comprising:
   automating one or more experimentation processes via an automated experimentation platform (AEP) by dynamically configuring to defined experiment types and to associated instrument devices, wherein the AEP includes a design of experiment (DOE) engine that generates statistically designed experiments related to the defined experiment types and to the associated instrument devices;
   automating data exchanges between the AEP and one or more target applications by importing and exporting data related to the defined experiment types and to the associated instrument devices without programming using a generalized exchange module (GEM), wherein the GEM includes both a design of experiment (DOE) exporter that writes control point settings of the defined experiment types to the associated instrument devices and a DOE importer that reads experiment result output data from the associated instrument devices; and
   enabling the data exchanges to be generic using the GEM.

8. The method of claim 7 wherein the one or more target applications include any of external software applications, devices, and instrument control programs (ICPs).

9. The method of claim 7 wherein the one or more experimentation processes comprises any of research, development, scientific and engineering processes.

10. The method of claim 7 wherein the data exchange automating step includes a plurality of kernel processes and a plurality of processes for constructing and interpreting templates.

11. The method of claim 10 wherein the enabling step comprises a plurality of processes for importing data and results from a company and providing the data in a generic language to the plurality of kernel processes and importing and exporting data from a target application and from the plurality of kernel processes using file-less data exchange.

12. The method of claim 11 wherein the enabling step comprises a generalized exchange module (GEM), the GEM further comprising:
   an instrument control program (ICP) importer that transforms an ICP native device description into the GEM native data structure;
   a template importer that transforms experiment type settings descriptions, analysis settings descriptions, and report settings descriptions into the AEP native data structure;
   a GEM graphical user interface (GUI) builder that transforms the GEM native data structure device descriptions into a dynamically configurable GEM GUI;
   an experiment set up GUI that enables construction of experiments for automatic execution using a physical device description;
   a design of experiments (DOE) exporter that writes control point settings for the experimenter; and
   a DOE importer that reads experiment result output data from the device.

13. A non-transitory computer readable medium containing program instructions for automating experimentation comprising:
   automating one or more experimentation processes via an automated experimentation platform (AEP) by dynamically configuring to defined experiment types and to associated instrument devices, wherein the AEP includes a design of experiment (DOE) engine that generates statistically designed experiments related to the defined experiment types and to the associated instrument devices;
   automating data exchanges between the AEP and one or more target applications by importing and exporting data related to the defined experiment types and to the associated instrument devices without programming using a generalized exchange module (GEM), wherein the GEM includes both a design of experiment (DOE) exporter that writes control point settings of the defined experiment types to the associated instrument devices and a DOE importer that reads experiment result output data from the associated instrument devices; and
   enabling the data exchanges to be generic using the GEM.

14. The computer readable medium of claim 13 wherein the one or more target applications include any of external software applications, devices, and instrument control programs (ICPs).

15. The computer readable medium of claim 13 wherein the one or more experimentation processes comprises any of research, development, scientific and engineering processes.

16. The computer readable medium of claim 13 wherein the data exchange automating step includes a plurality of kernel processes and a plurality of processes for constructing and interpreting templates.

17. The computer readable medium of claim 13 wherein the enabling step comprises a plurality of processes for importing data and results from a company and providing the data in a generic language to the plurality of kernel processes and importing and exporting data from a target application and from the plurality of kernel processes using file-less data exchange.

18. The computer readable medium of claim 17 wherein the enabling step comprises a generalized exchange module (GEM), the GEM further comprising:
   an instrument control program (ICP) importer that transforms an ICP native device description into the GEM native data structure;

a template importer that transforms experiment type settings descriptions, analysis settings descriptions, and report settings descriptions into the AEP native data structure;

a GEM graphical user interface (GUI) builder that transforms the GEM native data structure device descriptions into a dynamically configurable GEM GUI;

an experiment set up GUI that enables construction of experiments for automatic execution using a physical device description;

a design of experiments (DOE) exporter that writes control point settings for the experimenter; and a DOE importer that reads experiment result output data from the device.

* * * * *